(12) United States Patent
Seo et al.

(10) Patent No.: US 11,155,699 B2
(45) Date of Patent: Oct. 26, 2021

(54) NANOCELLULOSE COMPOSITE, AND METHOD FOR MANUFACTURING SAME

(71) Applicant: INDUSTRY-ACADEMIA COOPERATION GROUP OF SEJONG UNIVERSITY, Seoul (KR)

(72) Inventors: Young Soo Seo, Seoul (KR); Sang Yul Park, Seoul (KR); Hyo Sun Kim, Seoul (KR); Song Hee Lee, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 5 days.

(21) Appl. No.: 16/604,654

(22) PCT Filed: Apr. 12, 2018

(86) PCT No.: PCT/KR2018/004279
§ 371 (c)(1),
(2) Date: Oct. 11, 2019

(87) PCT Pub. No.: WO2018/190645
PCT Pub. Date: Oct. 18, 2018

(65) Prior Publication Data
US 2020/0157318 A1 May 21, 2020

(30) Foreign Application Priority Data

Apr. 14, 2017 (KR) .................. 10-2017-0048187
Apr. 3, 2018 (KR) .................. 10-2018-0038601

(51) Int. Cl.
*C08L 1/02* (2006.01)
*C08J 5/18* (2006.01)
(Continued)

(52) U.S. Cl.
CPC . *C08L 1/02* (2013.01); *C08J 5/18* (2013.01); *C08K 3/34* (2013.01); *C08K 5/5415* (2013.01);
(Continued)

(58) Field of Classification Search
None
See application file for complete search history.

(56) References Cited

U.S. PATENT DOCUMENTS

2011/0260348 A1 10/2011 Gardner et al.
2011/0263037 A1* 10/2011 Herz .................. C08K 3/36
436/163

(Continued)

FOREIGN PATENT DOCUMENTS

WO 2017004415 A1 1/2017

OTHER PUBLICATIONS

Cellulose nanofril core-shell silica coating and their conversion into thermally stable nanotube aerogel, Liu et al., J. Mater. Chem. A, 2015, 3, 15745 (Year: 2015).*

(Continued)

*Primary Examiner* — Peter A Salamon
(74) *Attorney, Agent, or Firm* — Sughrue Mion, PLLC

(57) ABSTRACT

Provided are nanocellulose composite and preparation method thereof. The method comprises preparing cellulose nanofiber, mixing the cellulose nanofiber with a silica precursor in a solvent to attach silica particles to the surface of the cellulose nanofiber, or to form a silica coating layer on the surface of the cellulose nanofiber, and mixing the cellulose nanofiber with the silica particles or the silica coating layer with a polymer. According to the present invention, by using surface vitrification-treated nano cellulose, nanocellulose polymer composites that exhibits high mechanical
(Continued)

properties such as impact resistance as well as excellent heat resistance can be prepared.

9 Claims, 5 Drawing Sheets

(51) Int. Cl.
    *C08K 3/34*     (2006.01)
    *C08K 5/5415*     (2006.01)
    *C08K 7/02*     (2006.01)
    *C08K 9/02*     (2006.01)
    *C08L 23/12*     (2006.01)
    *C08L 67/04*     (2006.01)
    *B82Y 30/00*     (2011.01)
    *B82Y 40/00*     (2011.01)

(52) U.S. Cl.
    CPC ................. *C08K 7/02* (2013.01); *C08K 9/02* (2013.01); *C08L 23/12* (2013.01); *C08L 67/04* (2013.01); *B82Y 30/00* (2013.01); *B82Y 40/00* (2013.01); *C08K 2201/003* (2013.01); *C08L 2203/16* (2013.01); *C08L 2207/066* (2013.01)

(56) References Cited

U.S. PATENT DOCUMENTS

2018/0186940 A1*   7/2018  Teipel ................... B82Y 30/00
2020/0157318 A1*   5/2020  Seo ......................... C08K 7/02

OTHER PUBLICATIONS

Liu et al., "Cellulose nanofibril core-shell silica coatings and their conversion into thermally stable nanotube aerogels" Journal of Materials Chemistry A, vol. 3, May 19, 2015, p. 15745-15754.

Raabe et al. "Biocomposite of Cassava Starch Reinforced with Cellulose Pulp Fibers Modified with Deposition of Silica ($SiO_2$) Nanoparticles" Journal of Nanomaterials, Jan. 29, 2015, vol. 2015, Article ID 493439, pp. 1-9 (11 pages total).

International Search Report dated Jul. 25, 2018 from the International Searching Authority in International Application No. PCT/KR2018/004279.

Written Opinion dated Jul. 25, 2018 from the International Bureau in International Application No. PCT/KR2018/004279.

* cited by examiner

The first embodiment

The second embodiment

SEM image of Comparative Example 1

SEM image of Preparation Example 1

TEM image of Preparation Example 1

TEM image of Preparation Example 1

SEM image of Preparation Example 1-1

Comparative Example 2

Preparation Example 2

Comparative Example 2

Preparation Example 2

Optical image of Comparative Example 3

Optical image of Preparation Example 3

Optical image of Comparative Example 4

Optical image of Preparation Example 4

Optical image of Comparative Example 5

Optical image of Preparation Example 5

NANOCELLULOSE COMPOSITE, AND METHOD FOR MANUFACTURING SAME

CROSS REFERENCE TO RELATED APPLICATIONS

This application is a National Stage of International Application No. PCT/KR2018/004279 filed Apr. 12, 2018, claiming priority based on Korean Patent Application Nos. 10-2017-0048187 filed Apr. 14, 2017 and 10-2018-0038601 filed Apr. 3, 2018.

TECHNICAL FIELD

The present invention relates to a composite, and more particularly to a nanocellulose composite.

BACKGROUND ART

Cellulose is the most abundant natural polymer in nature, and can be obtained mainly using wood and non-wood plants and bacteria. Cellulose is a linear polymer in which glucose, i.e., hexoses, are connected by β-1,4 bonds. These celluloses form fibers through hydrogen bonding between the polymer chains.

Cellulose fibers have not only high mechanical strength and modulus of elasticity, but also biocompatibility and biodegradability, so that the cellulose fibers have a high possibility of being applied as an eco-friendly filler replacing the existing fibrous filler for strength reinforcement. Therefore, cellulose fibers are currently being studied in various fields such as paper and clothing, and in particular, in a field of industrial light weight composite fillers because they have characteristics such as relatively low density compared to inorganic fillers for fiber reinforced composites.

Recently, cellulose has been used in a composite with metal nanoparticles, carbon materials or polymers, and in particular, research on cellulose polymer composites is actively underway. However, to make the cellulose polymer composites commercially available, the compatibility and dispersibility of the cellulose having hydrophilic functional groups and the hydrophobic polymers, and the weak heat resistance of the cellulose need to be improved.

DISCLOSURE

Technical Problem

In order to solve the above-described problems, the present invention is directed to providing a nanocellulose polymer composite exhibiting excellent heat resistance. In addition, the present invention is directed to providing a nanocellulose polymer composite having improved dispersibility of the nanocellulose in the polymer and improved high mechanical properties such as heat resistance as well as impact resistance.

Technical Solution

One aspect of the present invention provides a method for preparing nanocellulose polymer composite. The method comprises preparing cellulose nanofiber, mixing the cellulose nanofiber with a silica precursor in a solvent to attach silica particles to the surface of the cellulose nanofiber, or to form a silica coating layer on the surface of the cellulose nanofiber, and mixing the cellulose nanofiber with the silica particles or the silica coating layer with a polymer.

To attach the silica particles to the surface of the cellulose nanofiber, the cellulose nanofiber may be mixed with the silica precursor in an organic solvent. The silica particles may have an average diameter of 0.1 to 5 times the diameter of the cellulose nanofibers.

To form the silica coating layer on the surface of the cellulose nanofiber, the cellulose nanofiber may be mixed with the silica precursor in water. A polar organic solvent may be further added to the mixture of the cellulose nanofiber and the silica precursor in water. The silica coating layer formed on the cellulose nanofiber surface may have a bumpy surface.

The method may further comprise drying the cellulose nanofiber with the silica particles or the silica coating layer before mixing the cellulose nanofiber with the polymer. The polymer may be in a molten state when mixed with the dried cellulose nanofibers.

Another aspect of the present invention provides nanocellulose polymer composite. The composite comprises polymer matrix, and cellulose nanofibers dispersed in the matrix and having silica particles attached to a surface thereof or having a silica coating layer formed thereon. Strands of the cellulose nanofibers may be separated from each other due to the silica particles formed on the surface in the matrix.

The silica particles may have an average diameter of 0.1 to 5 times the diameter of the cellulose nanofibers. The silica particles may have an average diameter of 0.5 to 3 times the diameter of the cellulose nanofibers. The silica coating layer formed on the cellulose nanofiber surface may have a bumpy surface. The composite may be in a film form.

Advantageous Effects

According to the present invention, by using surface vitrification-treated nano cellulose, nanocellulose polymer composites that exhibits high mechanical properties such as impact resistance as well as excellent heat resistance can be prepared.

The technical effects of the present invention are not limited to those mentioned above, other technical effects not mentioned will be clearly understood to those skilled in the art from the following description.

MODES OF THE INVENTION

Figure 1:
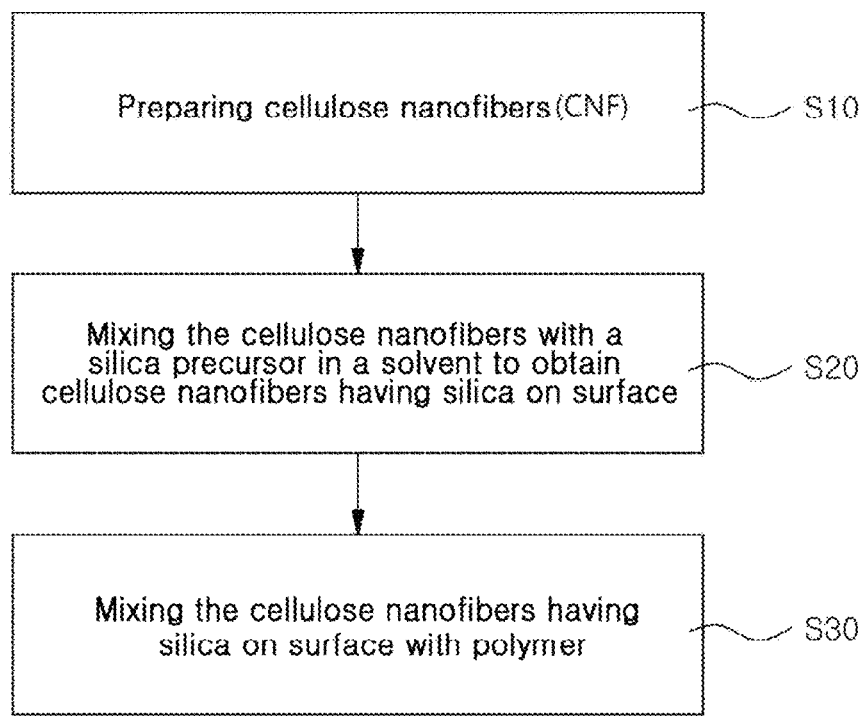
FIG. 1 is a flowchart illustrating a method for manufacturing a nanocellulose polymer composite according to an embodiment of the present invention.

Hereinafter, to more fully explain the present invention, embodiments according to the present invention will be described in further detail with reference to the accompanying drawings. However, the present invention may be embodied in different forms without limitation to the embodiments explained herein. Like reference numerals denote like elements throughout the specification.

In the specification, the sentence "a first layer is disposed "on" a second layer" means that these layers are in direct contact with each other, and a third layer(s) is/are disposed between these layers.

Figure 2:
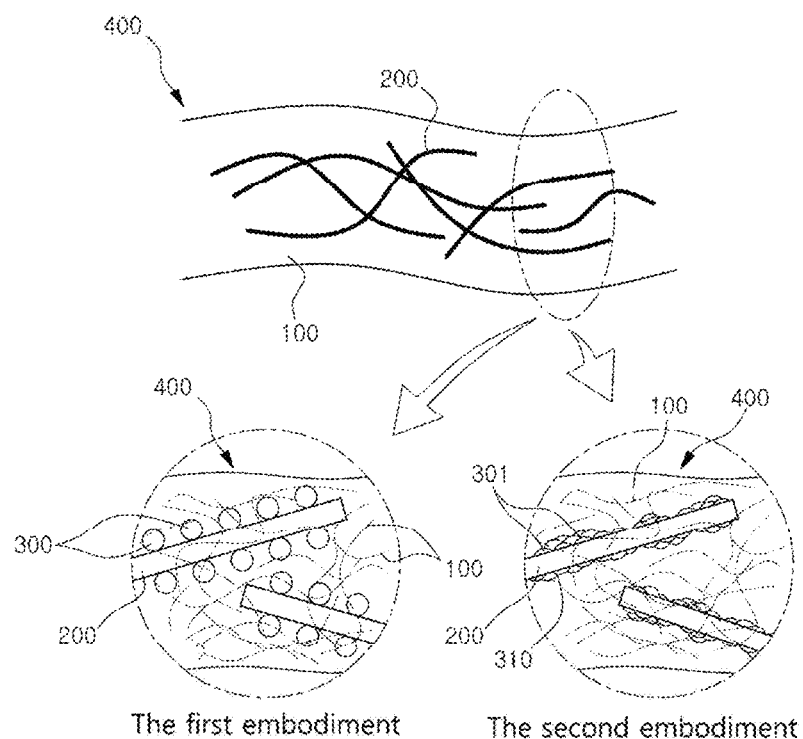
FIG. 2 is a schematic diagram illustrating a nanocellulose polymer composite.

FIG. 1 is a flowchart illustrating a method for manufacturing a nanocellulose polymer composite according to an embodiment of the present invention, and FIG. 2 is a schematic diagram illustrating a nanocellulose polymer composite.

Referring to FIGS. 1 and 2, cellulose nanofibers (CNF) 200 may be prepared (S10). The cellulose nanofiber 200 may be a fiber-shaped cellulose having an average diameter of nanometer size. Specifically, the cellulose nanofiber 200 is a bundle of cellulose chains each of which is a polysaccharide having a linear chain of β-1,4 linked glucose units, and has hydrogen bonds between the cellulose chains.

For example, the average diameter of the cellulose nanofibers 200 may be from several nm to several tens nm, specifically, 1 nm to 100 nm, more specifically, 5 nm to 50 nm, and more specifically, 10 nm to 30 nm. For example, the average length of the cellulose nanofibers 200 has a micrometer size, for example, the average length of the cellulose nanofibers 200 is several to several tens μm, specifically, 1 to 100 μm, more specifically, 5 to 30 μm.

The cellulose nanofibers 200 may be a natural cellulose nanofiber isolated from woodpulp or non-wood plants by physical treatment, chemical treatment, or a combination thereof. For example, the chemical treatment is a treatment using an oxidizing agent such as an N-oxyl compound, specifically 2,2,6,6-tetramethylpiperidine-N-oxyl (TEMPO).

The cellulose nanofibers 200 may be prepared as a cellulose nanofiber (CNF) dispersion. Specifically, the CNF dispersion may have cellulose nanofibers 200 having hydrophilic functional groups and a hydrophilic solvent as a solvent. For example, the CNF dispersion may be a CNF aqueous dispersion in which cellulose nanofibers 200 are dispersed in water. As an example, the cellulose nanofibers 200 in the CNF aqueous dispersion may be included in an amount of 0.5 wt % to 2 wt %, for example, 1 wt % based on the weight of the CNF aqueous dispersion.

The cellulose nanofibers 200 may be mixed with a silica precursor in a solvent (S20). In other words, the silica precursor may be put into the CNF dispersion where the cellulose nanofibers 200 are dispersed in the solvent. As a result, silica may be formed on the surface of the cellulose nanofiber 200. Specifically, silica particles 300 may be attached to the surface of the cellulose nanofibers 200, or silica coating layer 310 may be formed on the surface of the cellulose nanofibers 200. The silica precursor may be 1 to 20 parts by weight, for example 10 parts by weight with respect to 1 part by weight of the cellulose nanofibers 200 in the solvent.

The silica on the surface of the cellulose nanofiber 200 may be formed using alcohol or water as the solvent. In a first embodiment, the silica may be the silica particles 300 when alcohol is used as the solvent. In a second embodiment, the silica may be the silica coating layer 310 when water is used as the solvent.

In the first embodiment, after removing water from the CNF aqueous dispersion to leave cellulose nanofibers 200, the remaining cellulose nanofibers 200 may be redispersed in alcohol, for example, ethanol to obtain a CNF alcohol dispersion. The step for removing solvent from the CNF dispersion and the step for redispersing the remaining cellulose nanofibers 200 in alcohol can be repeated at least 2 times. To remove solvent from the CNF dispersion, the CNF dispersion may be centrifuged.

The silica precursor may be put into the CNF alcohol dispersion. The silica precursor may be a silane having 3 to 4 alkoxy groups, specifically, tetraethoxy silane (TEOS), tetramethoxysilane (TMOS), triethoxyethylsilane (TEES) or 1,2-bis (triethoxysilyl) ethane (BTSE). The silica precursor may form silica in the form of a plurality of particles 300 on the surface of the cellulose nanofiber 200 through a sol-gel reaction.

In other words, an alcohol other than water, for example, ethanol may be used as the solvent, and the cellulose nanofibers 200 and the silica precursor may be mixed in the solvent to form silica particles 300 attached on the surface of the cellulose nanofibers 200. In this case, the silica particles 300 may be dispersed without being aggregated on the surface of the cellulose nanofibers 200, and at least a portion of the surface of the cellulose nanofibers 200 may be exposed between silica particles 300.

The vitrification of a portion of the surface of the cellulose nanofibers 200 due to the formation of silica and the volume of the silica particles 300 themselves may raise the spacing between the cellulose nanofibers 200, thereby preventing aggregation of the cellulose nanofibers 200 during the process in which the cellulose nanofibers 200 and a polymer 100 form a composite as described later. Therefore, the cellulose nanofibers 200 having the silica particles 300 attached thereon can be dispersed in a polymer matrix 100 as described later.

To improve the dispersibility of the cellulose nanofibers 200, the average diameter of the silica particles 300 may be 0.1 to 5 times, specifically 0.5 to 3 times more specifically, 0.5 to 2 times, more specifically, 1 to 2 times the average diameter of the cellulose nanofibers 200. Silica particles 300 may be contained in an amount of 0.5 to 2 parts by weight based on 1 part by weight of cellulose nanofibers 200.

In addition, the surface vitrification of the cellulose nanofibers 200 may have an effect of compensating for low heat resistance of the cellulose nanofibers 200 itself. The heat resistance improvement characteristic will be described in more detail later.

In the case of mixing the silica precursor in the solvent, a catalyst for promoting the silica synthesis reaction may be further added. For example, the catalyst may be an acid solution or a basic solution, specifically, a basic solution, for example, an aqueous ammonia solution. The cellulose nanofibers 200 to which the silica particles 300 are attached may be washed at least twice with ethanol or the like and dried, for example, dried at a temperature of 80° C. by using a hot air oven.

In the second embodiment, the silica precursor may be added into the CNF aqueous dispersion. The silica precursor may be water glass, that is, sodium silicate ($Na_2SiO_3$). The the aqueous CNF dispersion with the silica precursor may be stirred. The silica precursor sodium silicate ($Na_2SiO_3$) is decomposed into sodium oxide ($Na_2O$) and silicon dioxide ($SiO_2$) in water, and the silicon dioxide ($SiO_2$) may be deposited on a portion of the surface of the cellulose nanofiber 200 in the form of a bumpy layer having a predetermined thickness. As a result, the silica coating layer 310 may be formed on the surface of the cellulose nanofibers 200 by directly injecting the silica precursor into the aqueous solution of CNF.

The silica coating layer 310 may be a layer having a predetermined thickness on the surface of the cellulose nanofibers 200, specifically, the silica coating layer 310 may be formed by aggregated silica particles 301. Thus, the silica coating layer 310 may have a surface roughness, that is, may have a rugged surface.

Polar organic solvent may be added into the CNF aqueous dispersion with the silica precursor. The polar organic solvent may be a polar aprotic solvent such as tetrahydrofuran (THF), ethyl acetate (EA), acetone (acetone), dimethylformamide (DMF), dimethyl sulfoxide (DMSO), or a polar protic solvent, for example, an alcohol such as, ethanol, methanol, n-butanol or isopropyl alcohol. In this case, the wettability of the cellulose nanofibers 200 by the solvent may be reduced to increase the surface roughness of the silica coating layer 310 formed by the water glass.

As described in the first embodiment, the vitrification of at least a portion of the surface of the cellulose nanofibers 200 due to the formation of the silica coating layer 310 and the thickness and the rugged surface of the silica coating layer 310 may raise the spacing between the cellulose nanofibers 200, thereby preventing aggregation of the cellulose nanofibers 200, improving dispersibility in a polymer matrix 100, and compensating for low heat resistance of the cellulose nanofibers 200 itself.

The silica coating layer 310 may have an average thickness of 0.1 times to 3 times, specifically, 0.4 times to 2 times the diameter of the cellulose nanofibers 200. Silica coating layer 310 may be contained in an amount of 0.5 to 2 parts by weight based on 1 part by weight of cellulose nanofibers 200.

Acetic acid aqueous solution may be added as a catalyst into the CNF aqueous dispersion with the silica precursor. The cellulose nanofibers 200 on which the silica coating layer 310 is formed may be washed several times with water and ethanol and dried, for example, dried at a temperature of 80° C. by using a hot air oven.

The cellulose nanofibers 200 on which the silica particles 300 or the silica coating layer 310 is formed may be mixed with the polymer 100 (S30), thereby forming the cellulose nanofibers/polymer composite, that is the nanocellulose polymer composite 400. The polymer 100 is not particularly limited as long as it can form a composite with the cellulose nanofiber, but the polymer may be a thermoplastic polymer such as polypropylene (PP), low density polyethylene (LDPE), polylactic acid (PLA) or polyethylene terephthalate (PET).

When the cellulose nanofibers 200 and the polymer 100 are mixed, the polymer 100 may be a polymer in a melt state. To this end, the polymer 100 and the cellulose nanofibers 200 having silica formed on the surface thereof may be mixed under high temperature conditions. In this case, the mixing may be performed in the absence of a solvent. For example, the cellulose nanofibers 200 may be mixed in an amount of 1 wt % to 10 wt %, specifically, 1 wt % to 5 wt %, and more specifically, 2 wt % to 4 wt % based on the weight of the polymer 100.

As an example, the mixing can be performed in a melt mixer. For example, the mixing may be performed at high temperature conditions at which the polymer may be melted. The temperature may be 100° C. or more, specifically, 100° C. to 300° C., more specifically, 110° C. to 270° C. Such temperature conditions may vary depending on the type of the polymer. As an example, when the polymer is polypropylene, the mixing may be performed at a temperature of 130° C. to 180° C., specifically 120° C. to 160° C., for example, 140° C. to 1 minute to 10 minutes, for example, 5 minutes. After the mixing, the resulting product can be cooled at room temperature (25° C.).

In some cases, the polymer 100 may be heated to a temperature near a melting point to melt the polymer 100, and then the cellulose nanofibers 200 having silica formed on the surface of the polymer 100 may be mixed. The melting point may vary depending on the type of the polymer.

In the nanocellulose polymer composite 400, the cellulose nanofibers 200 having silica formed on the surface may be dispersed in the polymer matrix 100. In the composite 400, a silica, specifically, the silica particles 300 or silica coating layer 310, formed on the surface of the cellulose nanofibers 200 may prevent agglomeration between the cellulose nanofibers 200, thereby evenly dispersing the cellulose nanofibers 200 in the polymer matrix 100.

In addition, the surface vitrification, i.e., silica coating on the surface of the cellulose nanofiber 200 allows to overcome the low heat resistance of the cellulose nanofiber 200 itself. That is, when the surface of the cellulose nanofiber 200 is vitrified, that is, coated with silica, thermal oxidation or thermal decomposition of the cellulose nanofiber 200 may be prevented during the process forming the composite 400 of the cellulose nanofiber 200 and the polymer 100 at a high temperature (for example, 100 to 300° C.). In addition, the cellulose nanofibers/polymer composites 400 can exhibit high heat resistance and can also exhibit high mechanical properties such as impact resistance.

The cellulose nanofibers/polymer composites 400 may be manufactured in a film form as an example. The composite 400 can be applied to the field requiring high heat resistance and impact resistance, for example, the field of reinforced plastics such as a vehicle exterior material, a battery protection film of an electric vehicle, and the like.

Hereinafter, examples are provided to help in understanding the present invention. However, the following examples are merely provided to help in understanding of the present invention, and the present invention is not limited to the following examples.

Preparation Example 1: Preparation of Cellulose Nanofibers Having Silica Particles 50 g of CNF aqueous dispersion including 1 wt % cellulose nanofiber (0.5 g) was prepared. The aqueous dispersion was centrifuged to remove water and the remaining cellulose nanofiber was dispersed in ethanol. The centrifugation and the dispersion in ethanol were repeated once more. The resulting dispersion in which the cellulose nanofibers were redispersed in 60 ml of ethanol sonicated and stirred for 1 hour. Then, 5 g of tetraethoxy silane (TEOS) was added at room temperature (25° C.), sonicated and sonicated and stirred for 30 minutes. Thereafter, after adding 2 ml of ammonia aqueous solution, the mixture was stirred for 2 hours, left for 30 minutes, washed three times with ethanol, and dried at 80° C. using a hot air oven.

Preparation Example 1-1: Preparation of Cellulose Nanofibers Having Silica Coating Layer 5 g of sodium silicate ($Na_2SiO_3$) was added to 50 g of CNF aqueous dispersion including 1 wt % cellulose nanofiber (0.5 g), followed by sonication and stirring for 30 minutes. Then, after adding 1 ml of acetic acid at room temperature (25° C.), the mixture was stirred for about 12 hours, left for 30 minutes, washed twice with water and three times with ethanol, and dried at 80° C. using a hot air oven.

Preparation Example 2: Preparation of Cellulose Nanofibers/Polymer Composite Films Comprising Silica Particles Cellulose nanofibers having silica particles prepared in Preparation Example 1 and polypropylene (PP) were put in a melt mixer, mixed at 140° C. for 5 minutes, and cooled at room temperature to prepare a cellulose nanofiber/polymer composite. The composite was pressed by a hot press preheated to 140° C. to form a cellulose nanofiber/polymer composite film.

Cellulose nanofiber/polymer composite films including silica particles was prepared in the same manner as in Preparation Example 2, except that the polymer and temperature conditions in the melt mixer were changed. Specifically, low density polyethylene (LDPE) (Preparation Example 3), polylactic acid (PLA) (Preparation Example 4) and polyethylene terephthalate (PET) (Preparation Example 5) were used instead of polypropylene (PP) to prepare cellulose nanofiber/polymer composite films of Preparation Examples 3 to 5, respectively. Here, the temperature conditions in the melt mixer were set differently according to the polymer.

Comparative Example 1: Preparation of Cellulose Nanofibers without Silica

Cellulose nanofibers were prepared in the same manner as in Preparation Example 1, except that tetraethoxy silane (TEOS) and ammonia aqueous solution were not used, thereby preparing cellulose nanofibers containing no silica.

Comparative Examples 2: Preparation of Cellulose Nanofibers/Polymer Composite Films without Silica Cellulose nanofibers prepared in Comparative Example 1 and polypropylene (PP) were put in a melt mixer, mixed at 140° C. for 5 minutes, and cooled at room temperature to prepare a cellulose nanofiber/polymer composite. The composite was pressed by a hot press preheated to 140° C. to form a cellulose nanofiber/polymer composite film.

Cellulose nanofiber/polymer composite films without silica particles was prepared in the same manner as in Comparative Example 2, except that the polymer and temperature conditions in the melt mixer were changed. Specifically, low density polyethylene (LDPE) (Comparative Example 3), polylactic acid (PLA) (Comparative Example 4) and polyethylene terephthalate (PET) (Comparative Example 5) were used instead of polypropylene (PP) to prepare cellulose nanofiber/polymer composite films of Comparative Examples 3 to 5, respectively. Here, the temperature conditions in the melt mixer were set differently according to the polymer.

Table 1 below shows specific conditions for preparing cellulose nanofibers according to Preparation Examples 1, 1-1, and Comparative Example 1, and cellulose nanofibers/polymer composite films according to Preparation Examples 2 to 5 and Comparative Examples 2 to 5.

TABLE 1

| | cellulose nanofiber dispersion | | | polymer (temperature for melting) | nano-cellulose polymer composite film |
|---|---|---|---|---|---|
| | solvent | silica precursor | the form of silica | | |
| Preparation Example 1 | ethanol | TEOS | particle | — | — |
| Preparation Example 1-1 | water | sodium silicate | coating layer | — | — |
| Preparation Example 2 | ethanol | TEOS | particle | PP (140□) | film obtained |
| Preparation Example 3 | ethanol | TEOS | particle | LDPE (120□) | film obtained |
| Preparation Example 4 | ethanol | TEOS | particle | PLA (190□) | film obtained |
| Preparation Example 5 | ethanol | TEOS | particle | PET (265□) | film obtained |
| Comparative Example 1 | ethanol | — | — | — | — |
| Comparative Example 2 | ethanol | — | — | PP (140□) | film obtained |
| Comparative Example 3 | ethanol | — | — | LDPE (120□) | film obtained |
| Comparative Example 4 | ethanol | — | — | PLA (190□) | film obtained |
| Comparative Example 5 | ethanol | — | — | PET (265□) | film obtained |

Figure 3A:
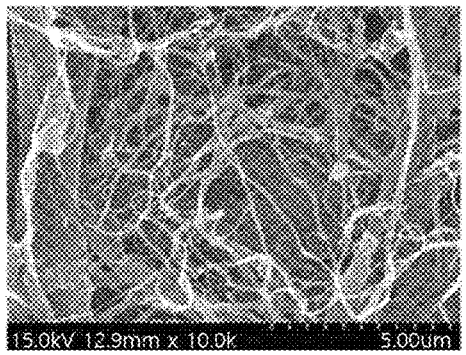
FIG. 3A is a scanning electron microscope (SEM) image of the cellulose nanofibers according to Comparative Example 1.
Figure 3B:
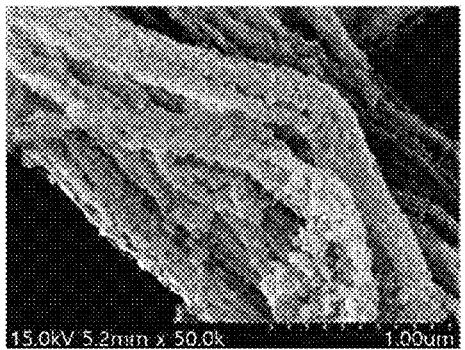
FIG. 3B is a SEM image of the cellulose nanofibers according to Preparation Example 1.
Figure 3C:
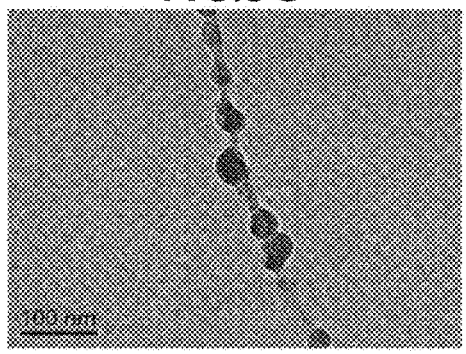
FIGS. 3C and 3D are transmission electron microscope (TEM) images of the cellulose nanofibers according to Preparation Example 1.
Figure 3D:
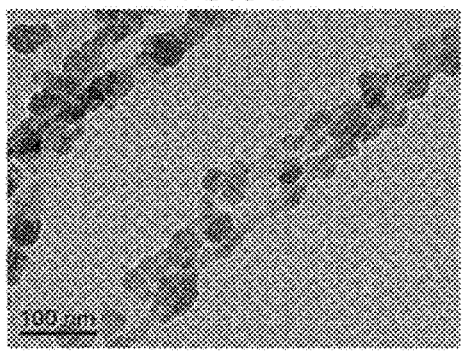

FIG. 3A is a scanning electron microscope (SEM) image of the cellulose nanofibers according to Comparative Example 1, FIG. 3B is a SEM image of the cellulose nanofibers according to Preparation Example 1, and FIGS. 3C and 3D are transmission electron microscope (TEM) images of the cellulose nanofibers according to Preparation Example 1.

Referring to FIG. 3A and FIG. 3B, cellulose nanofibers according to Comparative Example 1 are observed to have an average diameter of 30 to 50 nm and a length of several tens of micrometers, and appears to have nothing formed on the surface thereof. However, cellulose nanofibers according to Preparation Example 1 are observed to have silica particles uniformly dispersed on the surface of the cellulose nanofibers.

Referring to FIG. 3C and FIG. 3D, cellulose nanofiber according to Preparation Example 1 has silica particles about 0.5 to 3 times the diameter of the cellulose nanofiber on the surface of the cellulose nanofiber.

In particular, as shown in FIG. 3D, even in the region where a plurality of cellulose nanofibers appears to be agglomerated or locate very close together, it can be seen that the strands of the cellulose nanofibers are separated from each other due to silica particles formed on the surface of each strand of the cellulose nanofibers.

Figure 4:
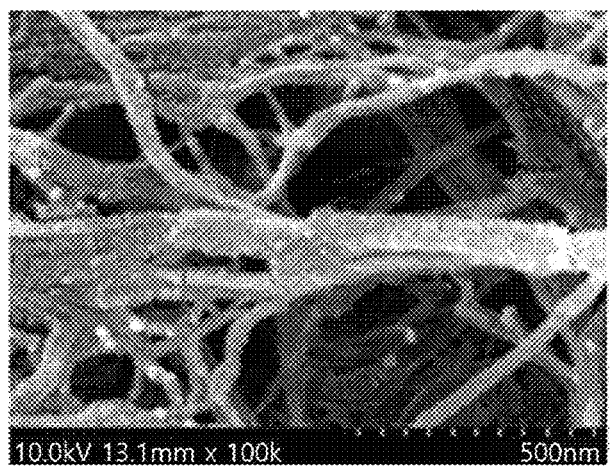
FIG. 4 is a SEM image of the cellulose nanofibers according to Preparation Example 1-1.

FIG. 4 is a SEM image of the cellulose nanofibers according to Preparation Example 1-1.

Referring to FIG. 4, it can be seen that the silica is formed on the surface of the cellulose nanofibers in the form of a bumpy layer, not in the form of particles.

Figure 5A:
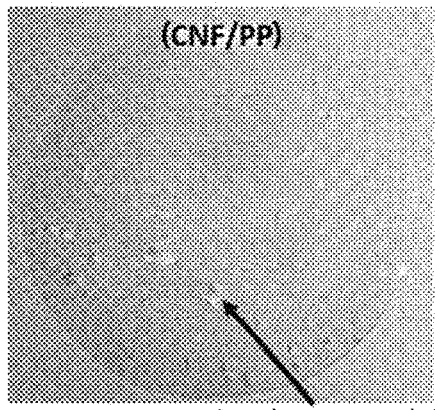
FIGS. 5A and 5B are optical images of the nanocellulose polymer composite films according to Comparative Example 2 and Preparation Example 2, respectively.
Figure 5B:
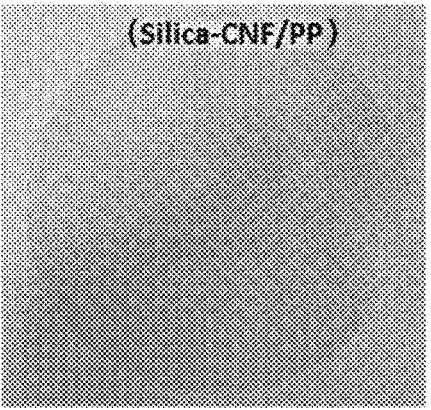
Figure 5C:
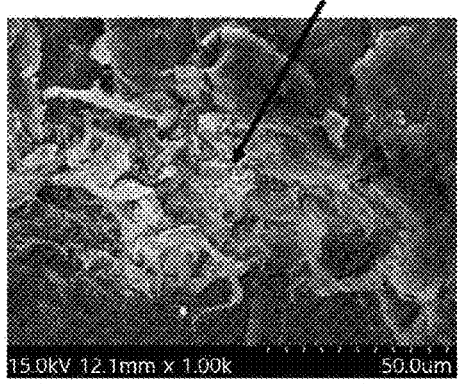
FIGS. 5C and 5D are field emission scanning electron microscope (FE-SEM) images of fracture surfaces of the nanocellulose polymer composite films according to Comparative Example 2 and Preparation Example 2, respectively.
Figure 5D:
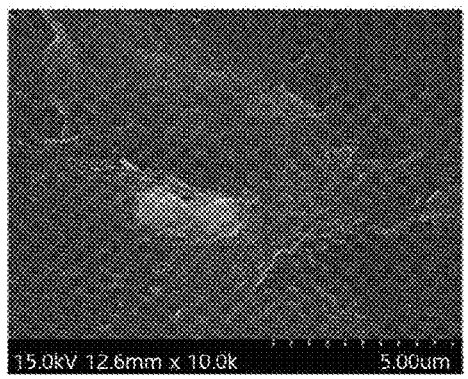
Figure 6A:
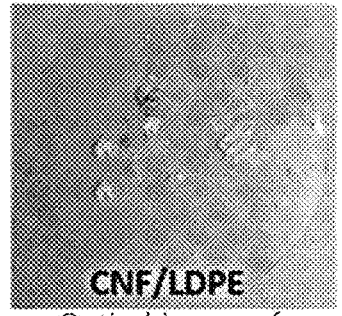
FIGS. 6A, 6B, 6C, 6D, 6E, and 6F are optical images of the composite films according to Comparative Example 3, Preparation Example 3, Comparative Example 4, Preparation Example 4, Comparative Example 5, and Preparation Example 5, respectively.
Figure 6B:
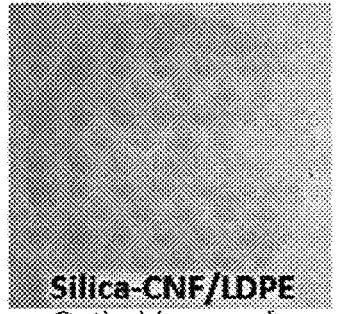
Figure 6C:
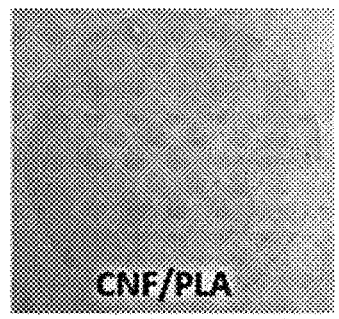
Figure 6D:
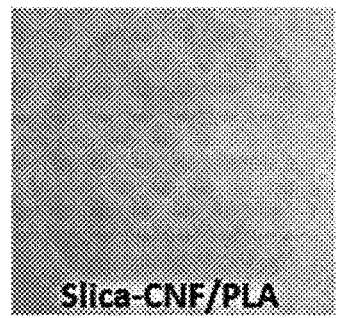
Figure 6E:
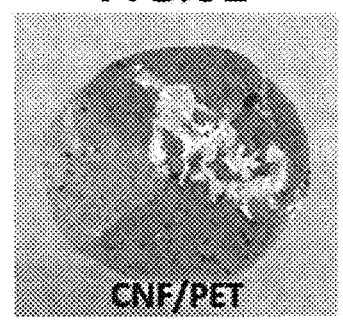
Figure 6F:

FIGS. 5A and 5B are optical images of the nanocellulose polymer composite films according to Comparative Example 2 and Preparation Example 2, respectively. FIGS. 5C and 5D are field emission scanning electron microscope (FE-SEM) images of fracture surfaces of the nanocellulose polymer composite films according to Comparative Example 2 and Preparation Example 2, respectively.

Referring to FIG. 5A and FIG. 5C, in the composite film of Comparative Example 2, it can be seen that the cellulose nanofibers are not dispersed but are agglomerated and observed with the naked eye. This could be interpreted as the result of the silica being not coated on the cellulose nanofibers and thus the dispersibility of the cellulose nanofibers in the film is not improved.

On the other hand, referring to FIG. 5B and FIG. 5D, in the composite film of Preparation Example 2, the cellulose nanofibers are well dispersed so that the film is overall transparent, and also independent cellulose nanofibers are not observed in the fracture surface. This is interpreted as the result of the silica particles formed on the surface of cellulose nanofibers.

FIGS. 6A, 6B, 6C, 6D, 6E, and 6F are optical images of the composite films according to Comparative Example 3, Preparation Example 3, Comparative Example 4, Preparation Example 4, Comparative Example 5, and Preparation Example 5, respectively.

Referring to FIGS. 6A, 6B, 6C, 6D, 6E, and 6F, compared with the Comparative Examples 3, 4 and 5, it can be confirmed that all of the composite films according to Preparation Examples 3, 4 and 5 are overall transparent. This is interpreted as a result of well-dispersed cellulose nanofibers having silica particles formed on the surface thereof.

Figures 7A, 7B, 7C:
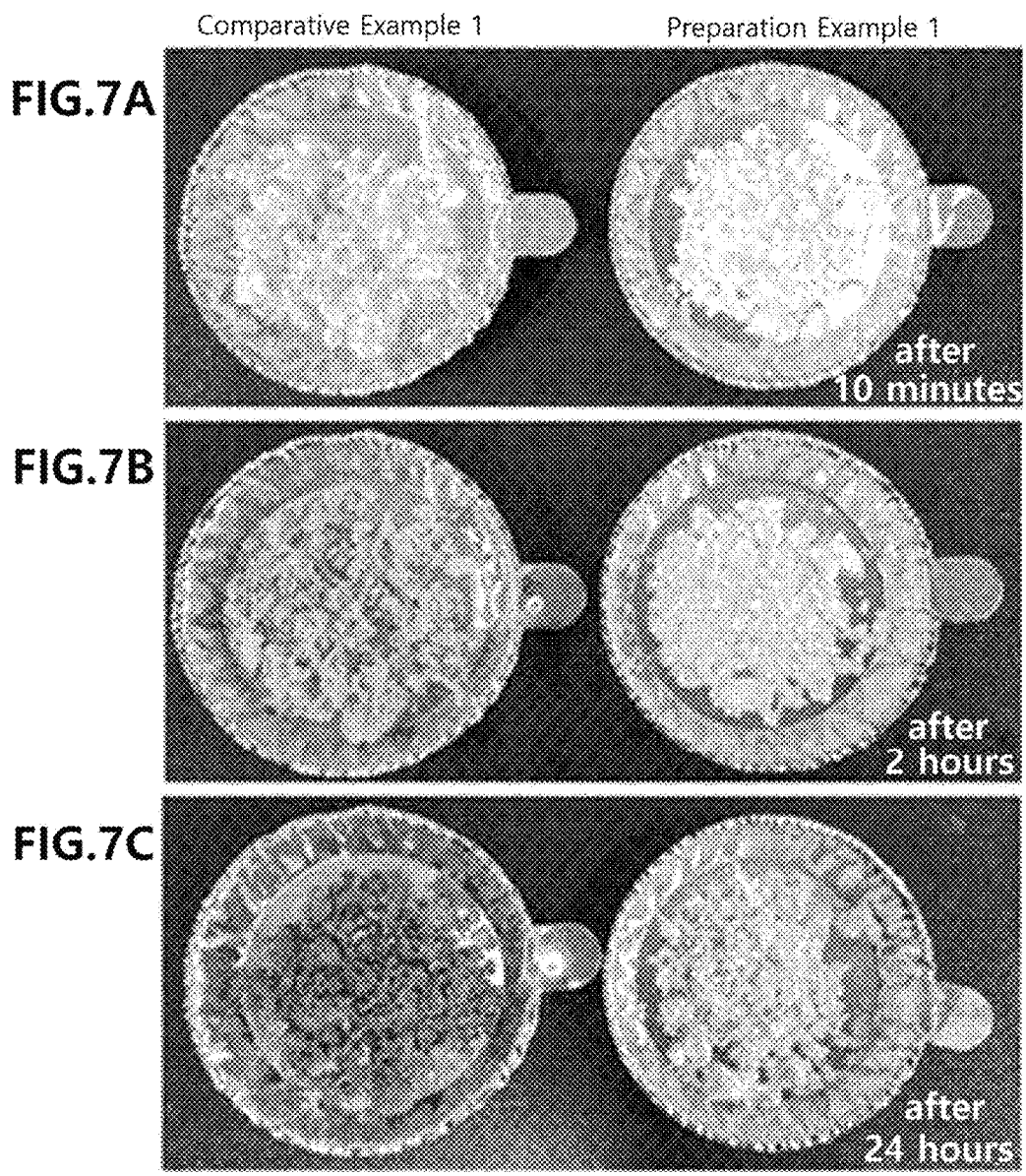
FIGS. 7A, 7B, and 7C are photographs of the cellulose nanofibers of Comparative Example 1 and Preparation Example 1 after 10 minutes, 2 hours, and 24 hours heat treatment, respectively.

FIGS. 7A, 7B, and 7C are photographs of the cellulose nanofibers of Comparative Example 1 and Preparation Example 1 after 10 minutes, 2 hours, and 24 hours heat treatment, respectively. In this experiment, the cellulose nanofibers of Comparative Example 1 and Preparation Example 1 were heat-treated at the temperature of 200□ in an ambient condition, and the change by heat was observed after 10 minutes, 2 hours, and 24 hours.

Referring to FIGS. 7A, 7B, and 7C, in Comparative Example 1 (left photographs), the cellulose nanofibers, which were not surface vitrified, were thermally oxidized and thermally decomposed by heat, and therefore a change in color, i.e., the color getting darker was noticeably observed as the heat treatment time increased.

On the other hand, in Preparation Example 1 (right photographs), even after 10 minutes and 2 hours of heat treatment, the color change of cellulose nanofibers was hardly observed with the naked eye. Only after 24 hours of heat treatment, minor color change was observed. From this, it can be assumed that cellulose nanofibers having silica formed on some parts of the surface thereof undergo thermal oxidation very slowly.

While the embodiments of the present disclosure and their advantages have been described in detail, it should be understood that various changes, substitutions and alterations may be made herein without departing from the scope of the present disclosure.

The invention claimed is:

1. A method for preparing nanocellulose polymer composite, the method comprising:
   preparing a cellulose nanofiber;
   mixing the cellulose nanofiber with a silica precursor in a solvent to form silica on at least a portion of the surface of the cellulose nanofiber; and
   mixing the cellulose nanofiber with the silica on the surface with a polymer to produce the nanocellulose polymer composite which includes a polymer matrix and the cellulose nanofibers with the silica on the surface dispersed in the polymer matrix,
   wherein the cellulose nanofibers are separated from each other due to the silica formed on the surface in the polymer matrix and the polymer matrix is disposed between the silica.

2. The method according to claim 1, wherein the silica is silica particles attached to the surface of the cellulose nanofiber.

3. The method according to claim 2, wherein, to attach the silica particles to the surface of the cellulose nanofiber, the cellulose nanofiber is mixed with the silica precursor in an organic solvent.

4. The method according to claim 2, wherein the silica particles have an average diameter of 0.1 to 5 times the diameter of the cellulose nanofibers.

5. The method according to claim 1, wherein the silica is a silica coating layer formed on the surface of the cellulose nanofiber.

6. The method according to claim 5, wherein, to form the silica coating layer on the surface of the cellulose nanofiber, the cellulose nanofiber is mixed with the silica precursor in water.

7. The method according to claim 6, wherein, a polar organic solvent is further added to the mixture of the cellulose nanofiber and the silica precursor in water.

8. The method according to claim 5, wherein the silica coating layer formed on the cellulose nanofiber surface has a bumpy surface.

9. The method according to claim 1, further comprising drying the cellulose nanofiber with the silica before mixing the cellulose nanofiber with the polymer, and
   wherein the polymer is in a molten state when mixed with the dried cellulose nanofibers.

* * * * *